United States Patent [19]

Harwick

[11] 4,383,605
[45] May 17, 1983

[54] ACCUMULATING CONVEYOR WITH PNEUMATIC CONTROL SYSTEM

[75] Inventor: Warren J. Harwick, Milwaukee, Wis.

[73] Assignee: Rexnord Inc., Milwaukee, Wis.

[21] Appl. No.: 250,437

[22] Filed: Apr. 2, 1981

[51] Int. Cl.³ .............................................. B65G 13/06
[52] U.S. Cl. .................................................... 198/781
[58] Field of Search ........................ 198/460, 781, 789

[56] References Cited

U.S. PATENT DOCUMENTS

| | | | |
|---|---|---|---|
| 3,537,568 | 11/1970 | Leach | 198/781 |
| 3,770,102 | 11/1973 | DeGood | 198/781 |
| 4,109,783 | 8/1978 | Voght | 198/781 |
| 4,174,777 | 11/1979 | Riehle | 198/781 |
| 4,264,004 | 4/1981 | Harwick | 198/781 |

Primary Examiner—John J. Love
Assistant Examiner—Paul A. Sobel
Attorney, Agent, or Firm—Vance A. Smith; Robert H. Kelly

[57] ABSTRACT

A control system for an accumulating conveyor having a plurality of zones wherein each zone has a pneumatic logic module that includes a relay limit valve and one or more OR valves. The output of one OR valve is connected to air actuators which affect driving engagement and disengagement of drive rollers with the load carrying rollers of a zone of the conveyor. A pilot operated relay valve is connected to the discharge zone of the conveyor and employed to release an article thereon. The control system can easily be modified to provide accumulation in either direction, as well as single, sequential or train release in both directions.

19 Claims, 5 Drawing Figures

ACCUMULATING CONVEYOR WITH PNEUMATIC CONTROL SYSTEM

BACKGROUND OF THE INVENTION

The present invention relates to a control system for conveyors, and more particularly to a pneumatic system for controlling a zero pressure accumulating conveyor.

The term "zero pressure", as used in the context of accumulating conveyors, refers to an accumulating conveyor having controlled spacing between the containers, pallets or other articles being conveyed. Controlled spacing prevents contact between the conveyed articles which in turn minimizes any damage resulting from the conveying process. Controlled spacing is generally achieved by using a conveyor system having a plurality of independently controlled segments or zones.

Zero pressure accumulating conveyors employing pneumatic control systems are known in the art. An example of one such arrangement is disclosed in U.S. Pat. application Ser. No. 944,131, now U.S. Pat. No. 4,264,004, filed Sept. 20, 1978, by Warren J. Harwick, entitled "Control System For Accumulating Conveyors", and assigned to the assignee of the present application. U.S. Pat. No. 4,264,004 discloses the use of AND valves in a pneumatic logic system for controlling a zero pressure accumulating conveyor.

While accumulating conveyors having zero pressure and employing pneumatic control systems are known in the art, there remains a need for versatile control systems which can be economically manufactured and installed and which offer flexibility in operation and design.

SUMMARY OF THE INVENTION

The present invention provides a pneumatic control system for a zero pressure accumulating conveyor. The control system includes a pneumatic logic module for each zone of an accumulating conveyor which includes a relay limit valve and one or more OR valves. Such an arrangement provides a versatile control system which can be adapted for accumulation in either direction, as well as single, sequential or train release in both directions.

The limit valve of each pneumatic logic module has a fluid passing position and a fluid not-passing or exhausted position, and is movable to its not-passing position in response to the presence of a conveyed article in the same zone. An OR valve for each pneumatic logic module has an outlet port and a pair of inlet ports. The OR valve provides fluid pressure from its outlet port to the actuating means of one of the zones of the conveyor in response to fluid pressure at either of its inlet ports. One of the inlet ports is connected to the limit valve in the same zone, and the other inlet port is connected to the logic module of the adjacent downstream zone of the conveyor.

In one aspect of the invention the outlet of the OR valve of each logic module provides fluid pressure to drive the load carrying rollers in the adjacent upstream zone of the conveyor, and its other inlet is connected to the outlet of the OR valve in a logic module in an adjacent downstream zone of the conveyor. Such an arrangement permits each OR valve to control the adjacent upstream zone to provide for accumulating articles on the conveyor. The control system includes a release control having pilot operated relaying valves and a timing relay associated with the discharge zone of the conveyor, and employed to selectively release an article thereon in a single release mode, or a sequential release mode. This arrangement can be easily modified to provide a train release mode for the conveyor by adding a second OR valve to each logic module between the output of the first OR valve and a train release fluid supply line controlled by a relay valve in the release control.

In another aspect of the invention the pneumatic logic module in each zone of the conveyor includes an OR valve providing fluid pressure from its outlet to drive the load carrying rollers in the same zone of the conveyor in response to fluid pressure at either of its inlet ports. One of its inlet ports is connected to the limit valve in the same zone, and the other of its inlet ports is connected to the limit valve in the logic module of the adjacent downstream zone of the conveyor. The control system includes a release control having a pilot operated relay valve and a timing relay associated with the discharge zone of the conveyor and employed to selectively release an article thereon in a single release mode, or sequential release mode. A train release mode may also be provided by adding a second OR valve in each logic module between the output of the first OR valve and a train release fluid supply line controlled by a relay valve in the release control.

In another aspect of the invention brakes may be utilized to stop the load carrying rollers in each zone to prevent overtravel of heavy articles conveyed thereon so that zero pressure accumulation is assured.

The present invention thus provides an improved control system for a zero pressure accumulating conveyor. The control system of the invention utilizes OR valves which offer versality in operation and design.

Other advantages will appear during the course of the following description.

BRIEF DESCRIPTION OF THE DRAWINGS

The drawings illustrate the best modes presently contemplated of carrying out the invention.

In the drawings.

DESCRIPTION OF THE PREFERRED EMBODIMENTS

Figure 1:
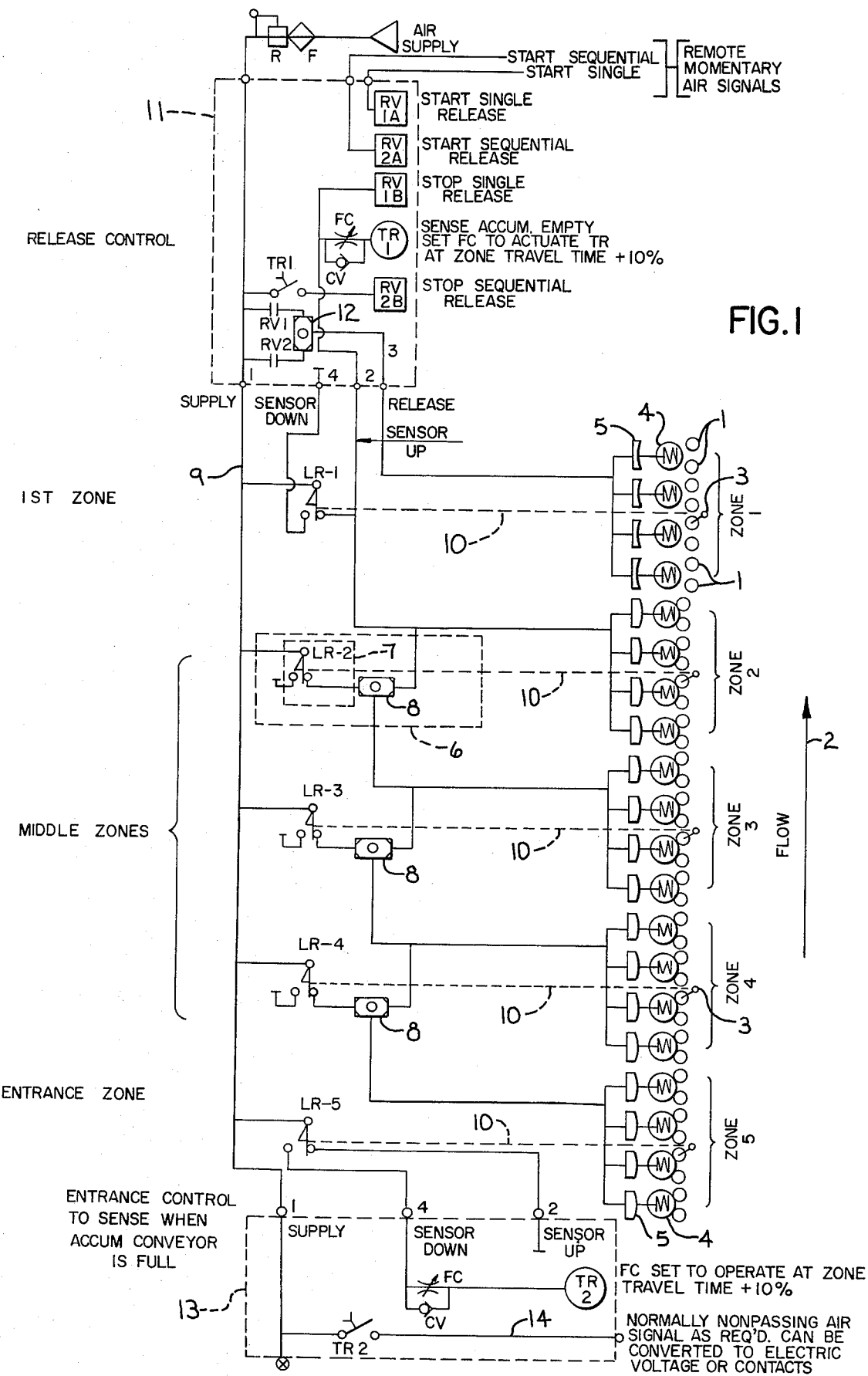
FIG. 1 is a schematic view of an accumulating conveyor having single and sequential release features constituting one embodiment of the present invention.

Referring now to the drawings, FIG. 1 schematically illustrates the present invention which provides a control system for a zero pressure accumulating conveyor and a pneumatic logic module for use therein. The pneumatic control system of the present invention is intended for use in controlling an accumulating conveyor having a plurality of zones, each zone having an independently controllable drive means.

The conveyor schematically illustrated in FIG. 1 comprises a plurality of load carrying rollers 1 rotatably mounted between a pair of longitudinally extending side rails (not shown) in the usual manner. As illustrated, the conveyor is divided into a plurality of independently controlled segments or zones and there are five zones in the particular embodiment shown in FIG. 1. As shown, the zones are arranged for the movement of pallets, packages or other articles in the direction shown by arrow 2 from the bottom toward the top of FIG. 1. As illustrated, zone 1 is the discharge zone of the conveyor while zone 5 is the entrance zone and zones 2-4 are the middle zones. It is readily apparent to those skilled in the art that the entrance and discharge zones may be reversed depending upon the desired direction of accumulation, and any number of middle zones may be utilized depending upon the desired length of the conveyor.

A sensing roller 3 or equivalent device is provided between the appropriate pairs of rollers 1 of each zone depending on zone length and the size of packages to be conveyed for sensing a package or other conveyed article thereon for controlling the accumulating functions of the conveyor. In the embodiment shown in FIG. 1, the load carrying rollers 1 in a given zone are driven by a plurality of drive rollers 4 with a pair of load carrying rollers 1 in a given zone driven by a single drive roller 4. Each drive roller 4 is biased by a spring into a disengaged position, and a fluid actuating means such as a diaphragm air actuator 5 is connected to each drive roller 4. Each diaphragm actuator 5 serves the purpose of holding its corresponding drive roller 4 in frictional driving engagement with the bottom surface of a pair of load carrying rollers 1. The drive rollers 4 may be driven in any conventional manner, such as a chain drive, or belt drive and the arrangement shown in FIG. 1 is such that when the drive rollers 4 are rotated in a clockwise direction and are in driving engagement with the load carrying rollers 1, the load carrying rollers 1 engaged thereby are driven in a counterclockwise direction.

It will be appreciated from the following description that the control system of the present invention is not only useful in conjunction with the conveyor system shown in FIG. 1, but is readily adaptable for use with most accumulating conveyors having zones or segments which have separate drive means for each zone.

The control system of the present system generally comprises a pneumatic logic system having a plurality of zones corresponding to zones 1-5 of the conveyor. The control system includes a pneumatic logic module generally indicated by the number 6 and enclosed in dotted lines for each of the zones of the conveyor. Each of the logic modules 6 controls and powers a zone of the conveyor and operates to actuate or deactuate the diaphragms 5 in each zone to engage or disengage the driving rollers with or from the load carrying rollers 1 in the corresponding conveyor zone. Each pneumatic logic module 6 incorporates valve means serving "OR" logic functions, as well as a 3-way RELAY-LIMIT valving function. As schematically shown in FIG. 1, each logic module 6 comprises a 3-way limit valve 7, and an OR valve or shuttle valve 8. The input port of each limit valve 7 is connected to an air supply line 9, and each limit valve 7 passes input pressure to one or the other of its output ports, but not simultaneously to both, and the output port not being charged is vented to the atmosphere or exhausted. Each limit valve 7 is mechanically linked to a load sensing means or sensing roller 3 which determines its valving position, the mechanical linkage being represented by the dotted line 10. Limit valves 7 are designated LR-1 through LR-5 in FIG. 1, and are shown in a "normal" position in FIG. 1 as would be the case with no load present on the associated conveyor zone. The normally passing output port of limit valve 7 is connected to one of the input ports of OR valve 8 of the same zone, and the normally not passing output port is vented to the atmosphere or exhausted. The outlet port of OR valve 8 is connected to the actuating means or diaphragms 5 in the adjacent upstream zone of the conveyor. As used herein, the term "upstream zone" refers to the zone of the conveyor earlier traversed by a conveyed load moving in the direction of arrow 2. "Downstream zone" refers to the zone later traversed by a conveyed load moving in the direction of arrow 2. OR valve 8 provides fluid pressure from its outlet port to the actuating diaphragms 5 in the adjacent upstream zone of the conveyor in response to fluid pressure at either of its inlet ports. As previously described, one of the inlet ports is connected to the normally passing output port of limit valve 7 in the same zone. The other of the inlet ports or OR valve 8 is connected to the outlet port of OR valve 8 in logic module 6 of the adjacent downstream zone of the conveyor.

Release control means indicated generally by the number 11 and enclosed in dotted lines, is employed in conjunction with a 3-way limit valve 7 and diaphragm actuators 5 at the discharge end of the conveyor, that is, zone 1 as shown in FIG. 1, in order to manually or electrically control the release of conveyed articles in either a single release mode or a sequential release mode. Release control means 11 comprises a pair of conventional pilot operated relay valves RV1 and RV2 employing an air return and normally in the "B" position or not passing position as shown in FIG. 1, in which position an article or package on zone 1 is not released. As will hereinafter be described, relay valve RV1 is utilized to provide a single release mode for the conveyor, and relay valve RV2 is utilized to provide a sequential release mode for the conveyor. Pilot port RV1A is connected to a remote momentary air signal input means, such as a manual push button or electric solenoid valve, and pilot port RV1B is connected to the normally passing output of 3-way limit valve 7 in the discharge zone of the conveyor and serves to reset relay valve RV1 to its normal "B" position. Pilot port RV2A is also connected to a remote momentary air signal input means and pilot port RV2B is connected to air supply line 9 and serves to reset relay valve RV2 to its normal not passing "B" position. The outputs of relay valves RV1 and RV2 are connected to the inlet ports of an OR valve 12, and the outlet port of OR valve 12 is connected to the diaphragm actuators 5 of the discharge zone of the conveyor. OR valve 12 provides fluid pressure to the diaphragms 5 in the discharge zone of the conveyor in response to fluid pressure at either of its inlet ports.

In addition, release control means 11 incorporates a timing relay TR1 which is normally in a not passing position, as shown in FIG. 1. Timing relay TR1 is conventional in design and incorporates a check valve CV and a flow control FC in the usual manner. The pilot port of timing relay TR1 is connected to the normally passing output of limit valve 7 in the discharge zone of the conveyor, and its normally not passing output is connected to pilot port RV2B of relay valve RV2.

Entrance control means, indicated generally by the number 13 and enclosed in dotted lines, is employed in conjunction with a 3-way limit valve 7 in the entrance zone of the conveyor, that is, zone 5 as shown in FIG. 1. The entrance control means is responsive to the presence of a conveyed article in the entrance zone of the conveyor and prevents additional articles from being fed to the entrance zone when the accumulating conveyor is full. Entrance control means 13 controls a feed conveyor or gate (not shown) to prevent the feeding of additional articles to the entrance zone of the conveyor. Entrance control means 13 comprises a conventional pilot operated timing relay TR2. The pilot port of timing relay TR2 is connected to the normally not passing position or article sensing position of limit valve 7 in the entrance zone of the conveyor, and the normally not passing output of timing relay TR2 is connected via line 14 to a control system for the feed conveyor or gate (not shown). It should be noted that the normally passing position of limit valve 7 in the entrance zone of the conveyor is vented to the atmosphere or exhausted.

In operation, a non-lubricated air supply is filtered at F and regulated by conventional regulator means R and supplied to air supply line 9 which provides a source of pneumatic pressure to the inputs of the 3-way limit valves 7 in each of the zones of the conveyor. Each of the limit valves 7 is shown in FIG. 1 in a normal position passing pneumatic pressure to OR valves 8 of the same zone, but not passing pneumatic pressure to the adjacent downstream zone due to the nature of the OR function of valves 8. Each OR valve 8 is shown passing pneumatic pressure to the actuating diaphragms 5 of the adjacent upstream zone in response to fluid pressure from its corresponding limit valve 7. As shown, however, pneumatic pressure is not being supplied to the discharge zone or zone 1 of the conveyor. Thus, all zones except for the discharge zone are normally in a driving or engaged position.

To disengage the drive rollers 4 of a particular zone the limit valve 7 of the adjacent downstream zone must be in a not normal or article sensing position indicating that an article is present on the downstream zone. Thus, a first article will be conveyed on "live" zones 2–5 until reaching zone 1 whereupon it will stop since zone 1 is "dead", i.e., is not being driven by drive rollers 4 when the diaphragms 5 are deactuated. As used herein, the term "live" zone refers to a zone of the conveyor wherein its load carrying rollers 1 are being driven by the drive rollers 4, and the term "dead" zone refers to a zone of the conveyor which is not being driven by drive rollers 4. When an article stops on zone 1 it will depress sensing roller 3 and switch limit valve 7 in zone 1 from the position shown in FIG. 1 to an article sensing position by means of its mechanical linkage 10 with sensing roller 3. In other words, limit valve 7 in zone 1 will move to the left as shown in FIG. 1 to an exhausted position. Thus, limit valve 7 in zone 1 will no longer pass pressure to the diaphragm actuators 5 in zone 2. Hence, drive rollers 4 of zone 2 will move to a disengaged position and load carrying rollers 1 will no longer be driven. Thus, when an article stops on zone 1 of the conveyor and moves limit valve 7 in zone 1 to an article sensing position, the adjacent upstream zone or zone 2 of the conveyor is transformed from a "live" zone to a "dead" zone.

A second article will be conveyed downstream until reaching zone 2 whereupon it will stop since zone 2 is now a "dead" zone. Upon reaching zone 2, the second article will depress sensing roller 3 and limit valve 7 in zone 2 will switch from its normal position to an article sensing position with the result that it is no longer passing pressure to OR valve 8 in zone 2. Consequently, OR valve 8 in zone 2 is no longer passing pressure to the diaphragm actuators 5 of zone 3 causing zone 3 to become a "dead" zone. In like manner, each zone of the conveyor will accumulate conveyed articles without contact therebetween until each zone has an article thereon. When an article stops in zone 5, or the entrance zone of the conveyor, limit valve 7 in zone 5 will switch from its normally exhausted position to an article sensing position whereby it passes pressure to the pilot port of timing relay TR2. After the desired interval of time, timing relay TR2 will move from its normally not passing position to a passing position to allow pneumatic pressure to be passed to a control system for a feed conveyor or gate arrangement to prevent further articles from being conveyed onto zone 5.

A single release function for the conveyor will now be described. Removal or release of a single article on zone 1 is accomplished manually by physically removing the article or by actuating release control means 11. By switching either a push button or a solenoid valve (not shown) to a passing condition, pressure is provided to pilot port RV1A which switches relay valve RV1 to a not normal or "A" condition wherein pressure is passed to an input of OR valve 12 from air supply line 9. Output pressure from OR valve 12 is supplied to the diaphragm actuators 5 in zone 1 of the conveyor whereupon drive rollers 4 will engage the load carrying rollers 1 of zone 1 to drive off or discharge an article thereon. Once the article is removed from zone 1, limit valve 7 in zone 1 will switch to its normal passing position since sensing roller 3 will no longer be depressed, and in consequence will charge the diaphragm actuators 5 in zone 2 as well as one input of OR valve 8 in zone 2. The output from OR valve 8 in zone 2 will charge the diaphragm actuators in zone 3 and one input of OR valve 8 in zone 3. This sequence will continue throughout the remaining zones of the conveyor until all of the zones are transformed from "dead" zones to "live" zones. However, when limit valve 7 in zone 1 is moved to its normal passing position upon the release of a package in zone 1, pressure is also provided to pilot port RV1B of relay valve RV1. Pressure at pilot port RV1B immediately returns relay valve RV1 to its normal not passing condition which in turn removes pressure from the diaphragm actuators 5 of zone 1. Thus, once an article is removed from zone 1, zone 1 becomes a "dead" zone. A package being driven onto zone 1 from zone 2 will therefore not be driven off of zone 1, but instead will depress sensing roller 3 in zone 1 to switch limit valve 7 in zone 1 to its not passing or exhausted position. This, in turn, removes pressure from the diaphragm actuators 5 of zone 2 resulting in zone 2 becoming a "dead" zone. This sequence continues throughout the remaining zones of the conveyor to transform the "live" zones to "dead" zones. In this manner, once an article is driven off of zone 1 of the conveyor the articles of all upstreams zones will advance one zone. Hence, the term "single release" is employed to describe this operation.

It should be noted that once an article is removed from zone 5, limit valve 7 of zone 5 returns to its exhausted position and pressure is removed from timing relay TR2. This permits a new article to be conveyed from a feed conveyor onto zone 5. However, as described above once the original article on zone 5 is driven onto zone 4, zone 5 becomes a "dead" zone and thus the new article on zone 5 stops thereon and switches limit valve 7 of zone 5 once again to supply pressure to timing relay TR2 to control the feed conveyor or gate and prevent another article from being driven onto zone 5.

Sequential release for the articles on the conveyor may be accomplished only by actuating release control means 11. By switching either a push button or a solenoid valve (not shown) to a passing condition, pressure is provided to pilot port RV2A which switches relay valve RV2 to a not normal or "A" condition wherein pressure is passed through OR valve 12 to the diaphragm actuators 5 of zone 1. As a result, an article in zone 1 will be driven off or discharged therefrom, and zones 2-5 will be transformed to "live" zones as previously described herein due to the switching of limit valve 7 in zone 1 to its normally passing condition. However, in contrast to the single release operation previously described, zone 1 in the sequential release mode will not be transformed to a "dead" zone once the article thereon is removed or driven therefrom. As seen in FIG. 1, the output from limit valve 7 in zone 1 is also connected to the pilot port of timing relay TR1 as well as to pilot port RV1B. It should be noted, however, that pilot port RV1B is associated with relay valve RV1 and not relay valve RV2. Therefore, pressure at pilot port RV1B will not return relay valve RV2 to its normally not passing position. Instead, pilot port RV2B controls the return of relay valve RV2 to its normally not passing condition and since pressure will not be provided to pilot port RV2B until timing relay TR1 is switched to a passing condition, all of the zones of the conveyor will remain in their "live" conditions. Thus, timing relay TR1 can be set for any desired length of time with the result that all five articles may be discharged from the conveyor or only the first two articles, or only the first three articles, or only the first four articles. It should also be noted that once the article on zone 5 is removed therefrom, limit valve 7 in zone 5 will return to its normally exhausted position allowing additional articles to be fed onto the conveyor from a feed conveyor (not shown). However, once timing relay TR1 is switched to its passing condition, fluid pressure will be provided to pilot port RV2B causing relay valve RV2 to return to its normally not passing condition. This in turn removes pressure from the diaphragm actuators 5 of zone 1 resulting in zone 1 becoming a "dead" zone, and accumulation of articles will once again take place as previously described herein.

Figure 2:
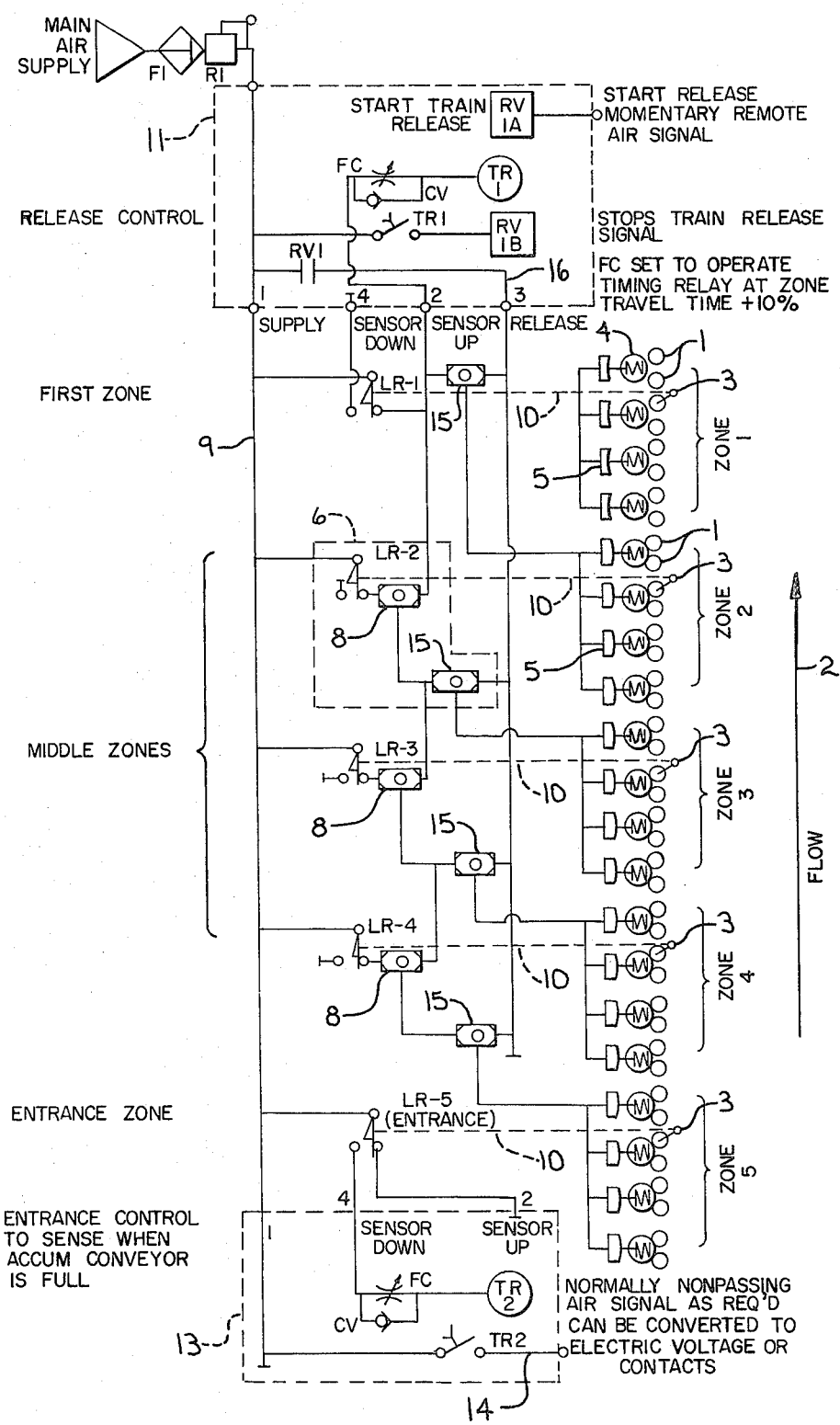
FIG. 2 is a schematic view of an accumulating conveyor similar to FIG. 1 except having a train release feature constituting a second embodiment of the present invention.

A second embodiment of the control system of the present invention is shown in FIG. 2, wherein the control system is adapted for the train release of all articles on the conveyor. The circuits of the control system shown in FIG. 2 are identical to the circuits shown in FIG. 1, with the exception that each pneumatic logic module 6 contains an additional OR valve 15 and the release control means 11 contains only a single relay valve RV1. The release control means indicated generally at 11 and enclosed in dotted lines in FIG. 2, is employed in conjunction with the 3-way limit valve LR1 and the diaphragm actuators 5 at the discharge zone or zone 1 of the conveyor in order to provide a train release for the accumulated articles. Release control means 11 comprises a conventional pilot operated relay valve RV1 employing an air return and normally in the "B" position, as shown in FIG. 2, in which position an article or load on zone 1 is not released. In addition, release control means 11 incorporates a conventional timing relay TR1 having its pilot port connected to the normally passing position of limit valve LR1 in zone 1. It should be noted that timing relay TR1, as shown in FIG. 2, is normally in a not passing position. Pilot port RV1A of relay valve RV1 is connected to a remote air signal input means, such as a push button or solenoid valve, and pilot port RV1B is connected to the normally not passing output of timing relay TR1 and serves to reset relay valve RV1 to its normal not passing "B" position. The output of relay valve RV1 provides fluid pressure to a train release supply 16, which in turn supplies pressure to diaphragm actuators 5 in zone 1.

The additional or second OR valves 15 in each logic module 6 provide fluid pressure from its outlet port to the diaphragm actuators 5 in the adjacent upstream zone of the conveyor in response to fluid pressure at either of its inlet ports. As shown in FIG. 2, one of the inlet ports of each OR valve 15 comprises the output of OR valve 8 in the same zone and the other inlet port of each valve 15 is connected to the train release supply line 16. OR valve 15 in zone 1, however, has one of its inlet ports connected to the normally passing output of limit valve LR1, and the other of its inlet ports connected to train release supply line 16.

In operation, the embodiment of the present invention, shown in FIG. 2, operates in a manner analogous to the embodiment shown and described in FIG. 1. Thus, accumulation occurs on the conveyor when an article is driven onto zone 1, which is "dead", and switches limit valve LR1 in zone 1 to its not passing position by depressing sensing roller 3. This in turn removes fluid pressure from the diaphragm actuators 5 of zone 2 and transforms zone 2 from a "live" zone to a "dead" zone. This sequence of operation continues until the conveyor has accumulated articles on all of its zones.

Train release of all of the accumulated articles on the conveyor is accomplished by actuating release means 11. By switching either a push button or a solenoid valve (not shown) to a passing condition, pressure is provided to inlet port RV1A which switches relay valve RV1 to a not normal or "A" condition wherein pressure is passed to the diaphragm actuators 5 in zone 1, and simultaneously through train release supply line 16 to each of the second OR valves 15 in logic modules 6. As a result, fluid pressure is supplied to the diaphragm actuators 5 in each zone of the conveyor simultaneously so that all of the "dead" zones 1-5 are transformed into "live" zones to discharge or drive off all of the articles on the conveyor. It should be noted, however, that the operation of zones 1-5 are controlled by timing relay TR1. In other words, zones 1-5 will be "live" only so long as fluid pressure is not provided to the pilot port of timing relay TR1. Once fluid pressure is supplied to the pilot port of timing relay TR1, timing relay TR1 is switched to a passing condition and pressure is supplied to pilot port RV1B of relay valve RV1 with the result that relay valve RV1 returns to its normally not passing condition. When relay valve RV1 switches to its not passing condition, fluid pressure is removed from train release supply line 16 and consequently from each of the second OR valves 15 and diaphragm actuators 5 with the result that each of the zones 1-5 will once again become "dead". It should also be noted, however, that once an article is driven from zone 5 limit valve LR5 will return to its normally exhausted position. This removes pressure from the pilot port of timing relay TR2 which then returns to its normally not passing position to allow new articles to be fed onto the conveyor from a feed conveyor (not shown) as previously described for the embodiment of FIG. 1.

Figure 3:
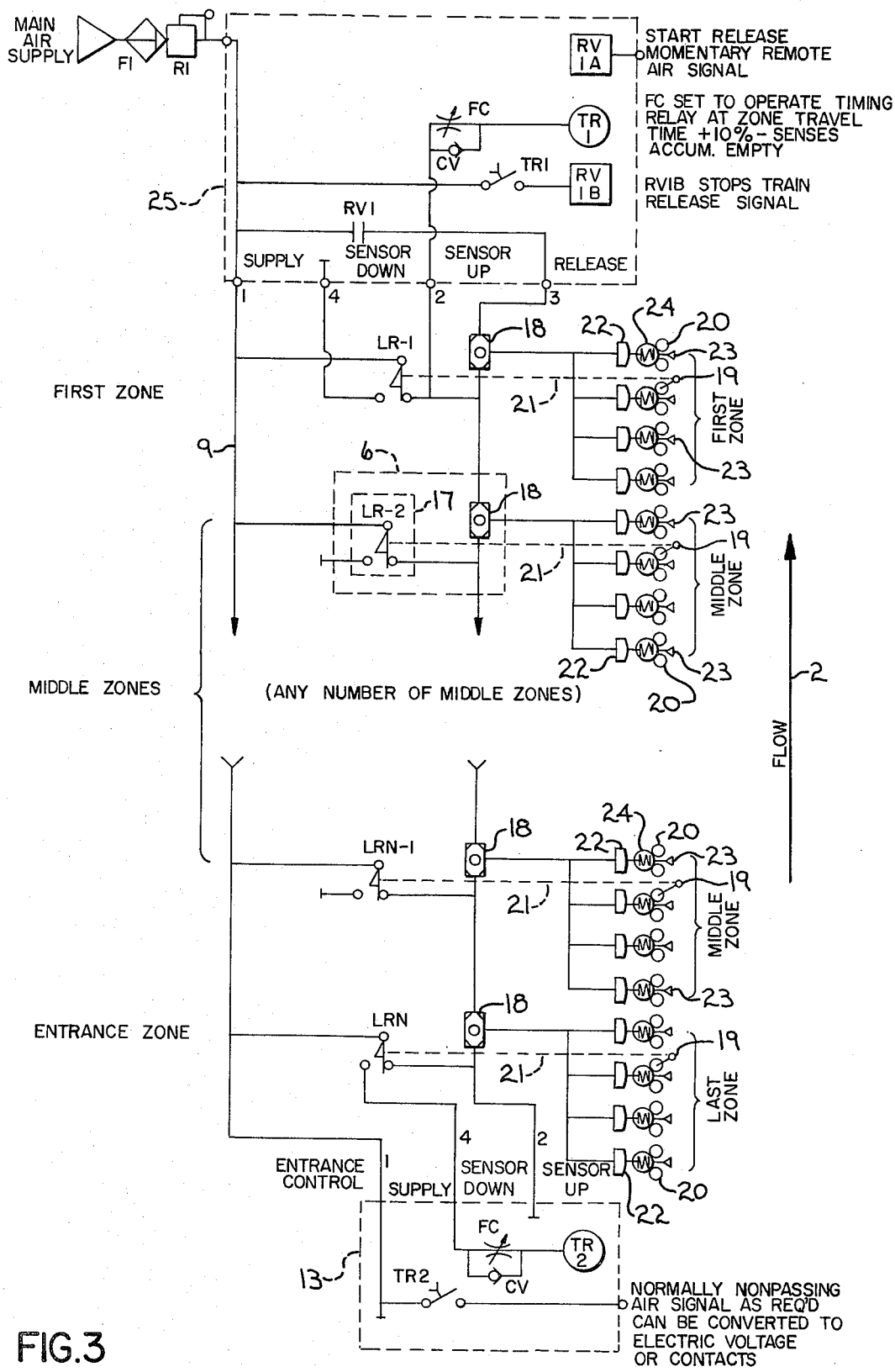
FIG. 3 is a schematic view of an accumulating conveyor with a brake having single and sequential release features constituting a third embodiment of the invention.

Referring now to FIG. 3, a third embodiment of the control system of the present invention is illustrated wherein the pneumatic logic modules 6 in each zone controls the drive rollers 4 in the same zone. It will be appreciated by those skilled in the art that this arrangement is in contrast to the previous two disclosed embodiments of this invention where the pneumatic logic module 6 of one zone controlled the drive rollers 4 of the adjacent upstream zone.

As shown in FIG. 3, each logic module 6 comprises a 3-way limit valve 17 (designated LR1 through LRN), and a shuttle valve 18 serving an OR function. The input port of each limit valve 17 is connected to the air supply line 9, and passes input pressure to one or the other of its output ports, but not simultaneously both, the output port not being charged being vented to the atmosphere or exhausted. Each limit valve 17 has a load sensing means which determines its valving position. The load sensing means shown in FIG. 3 is a sensing roller 19 disposed between the first and second pairs of load carrying rollers 20 which is mechanically linked to each limit valve 17. The linkage is schematically illustrated by the dotted line 21.

Each OR valve 18 in logic module 6 has an outlet port and a pair of inlet ports. Each OR valve 18 provides fluid pressure from its outlet port to the diaphragm actuators 22 of the same zone of the conveyor in response to fluid pressure at either of its inlet ports. One of the inlet ports of each OR valve 18 is connected to the limit valve 17 in the same zone, and the other of the inlet ports of each valve 18 is connected to the normally passing output of limit valve 17 in the logic module 6 of the adjacent downstream zone of the conveyor.

Each pair of load carrying rollers 20 in the conveyor illustrated in FIG. 3 has a brake 23 positioned therebetween. Each brake 23 is wedge-shaped and is connected to a drive roller 24 so that when the drive roller 24 is in driving engagement with the load carrying rollers 20 the brake 23 is disengaged from the rollers 20. However, when the drive roller 24 is disengaged from the load carrying rollers 20, the brake 23 is applied to the rollers 20 to stop their rotation. The brakes 23 prevent overtravel of relatively heavy loads to insure zero pressure accumulation since heavier loads have more momentum when they are driven than do lighter loads.

Release control means, indicated generally at 25 and enclosed in broken lines, is employed in conjunction with the 3-way limit valve LR-1 and diaphragm actuators 22 at the discharge end of the conveyor, i.e. zone 1 as shown, in order to control the release of conveyed articles. Release means 25 comprises a conventional pilot operated relay valve RV-1 employing air return and normally in the "B" position as shown in FIG. 3, in which position an article or load on zone 1 is not released. In addition, release means 25 incorporates a timing relay TR-1 having its pilot port connected to the normally passing output of 3-way limit valve LR-1. Pilot port RV-1A is connected to a remote air signal input means, such as a push-button or solenoid valve, and pilot port RV-1B is connected to the normally not passing output of timing relay TR-1 and serves to reset relay valve RV-1 to its normal "B" position. It should also be noted that the output of relay valve RV-1 comprises one of the inputs to OR valve 18 in zone 1.

In operation, air supply line 9 provides a source of pneumatic pressure to the input of the limit valves LR-1 through LR-N, each of which is shown in a normal position passing pneumatic pressure to one of the inputs of OR valves 18 in the same zone and in the adjacent upstream zone. As shown, each OR valve 18 is passing pneumatic pressure to the diaphragm actuators 22 in the same zone to overcome the spring force which normally disengages each drive roller 24 from the load carrying rollers 20 and applies its corresponding brake 23 with the result that the drive rollers 24 are moved into driving engagement with the load carrying rollers 20 and the brakes 23 are disengaged therefrom. Thus, all zones are normally "live" in a driving or engaged position.

To disengage the drive rollers 24 of a particular zone, the limit valve 17 of that zone must be in a not normal or article sensing position indicating an article is present in that particular zone. Thus, when the conveyor is accumulating articles a first article will be conveyed until reaching zone 1 whereupon limit valve LR-1 will switch from the position shown in FIG. 3 to an article sensing position where it no longer passes pressure to OR valve 18 in zone 1. Since relay valve RV-1 is normally in a not passing condition, pressure is removed from the diaphragm actuators 22 in zone 1 whereupon the drive rollers 24 become disengaged with load carrying rollers 20 and the brakes 23 are applied with the result that the first article is stopped on zone 1. A second article will be conveyed downstream until reaching zone 2 whereupon limit valve LR-2 will switch from the normal passing position to an article sensing position or exhausted position to remove pressure from one of the inlets of OR valve 18 in zone 2. However, since the other inlet of OR valve 18 in zone 2 is connected to limit valve LR-1 in zone 1, which has been switched to its exhausted position, pressure is not being provided to either of the inlet ports to OR valve 18 in zone 2. Consequently, pressure is removed from the diaphragm actuators 22 in zone 2 with the result that drive rollers 24 become disengaged from load carrying rollers 20 and the brakes 23 are applied to stop rollers 20. Thus, a second article is stopped on zone 2. In like manner, each zone of the conveyor will accumulate conveyed articles without contact therebetween until each zone has an article thereon. As previously described, when an article stops on the last zone or entrance zone of the conveyor, relay valve LR-N will switch to its load sensing position to provide pressure to the pilot port of a timing relay TR-2, and after the desired time interval timing relay TR-2 will switch to a passing position and provide pressure to the control means for a feed conveyor or gate arrangement to prevent further articles from being fed onto the conveyor.

Single release for an article on zone 1 is accomplished by actuating release means 25. By switching either a push button or a solenoid valve or other similar device to a passing condition pressure is provided to pilot port RV-1A which switches relay valve RV-1 to a not normal or "A" position where pressure is passed to an input of OR valve 18 in zone 1 from air supply line 9. OR valve 18 in zone 1 will then pass pressure to the diaphragm actuators 22 in zone 1 to engage the drive rollers 24 with the load carrying rollers 20 and disengage the brakes 23. As a result, the article on zone 1 is driven off or discharged from zone 1. Once the article is removed from zone 1, limit valve LR-1 will switch to a normal position and pass pressure to the inlet of OR valve 18 in the next adjacent upstream zone, or zone 2, of the conveyor. OR valve 18 in zone 2 will in turn pass pressure to the diaphragm actuators 22 in zone 2 to engage drive rollers 24 with load carrying rollers 20 and disengage brakes 23. In like manner, each zone of the conveyor will be transformed from a "dead" zone to a "live" zone.

However, it should be noted that when limit valve LR-1 switches to its normal position pressure is also supplied to timing relay TR-1 which controls the length of time relay valve RV-1 remains in its passing position. If timing relay TR-1 is set for a relatively short period of time, only a single article will be discharged from the conveyor and the remaining articles will advance one zone. In contrast, if timing relay TR-1 is set for a relatively long period of time, all of the articles on the conveyor or any number thereon, such as the first two articles or the first three articles, etc., may be discharged from the conveyor as desired. Thus, either single or sequential release may be provided for the articles on the conveyor. This operation will now be described. After relay valve RV-1 is switched to its passing condition to supply pressure through OR valve 18 in zone 1 to drive the first article therefrom, and relay valve LR-1 is switched to its normal position, pressure will also be provided to timing relay TR-1. Following the time interval preset into timing relay TR-1, pressure is provided to its pilot port with the result that timing relay TR-1 switches to its passing position so that pressure is supplied to pilot port RV-1B of relay valve RV-1. Pilot port RV-1B resets relay valve RV-1 to its normal "B" position wherein it does not pass pressure. As a result, pressure is no longer being provided to one of the inlets of OR valve 18 in zone 1. Also, once the second article is advanced to the first zone it will depress sensing roller 19 to switch limit valve LR-1 to its load sensing position which in turn will remove pressure to the other inlet of OR valve 18 in zone 1. Thus, pressure is removed from the diaphragm actuators 22 in zone 1 and drive rollers 24 become disengaged from load carrying rollers 20 and the brakes 23 are applied. Thus, the second article is only advanced one zone. This sequence is continued throughout all of the zones of the conveyor so that each article will only advance one zone. However, if it is desired to sequentially remove all of the articles on the conveyor the timing relay TR-1 is set for a sufficient interval so that zone 1 remains in a "live" condition until all of the articles are removed from the conveyor.

Figure 4:
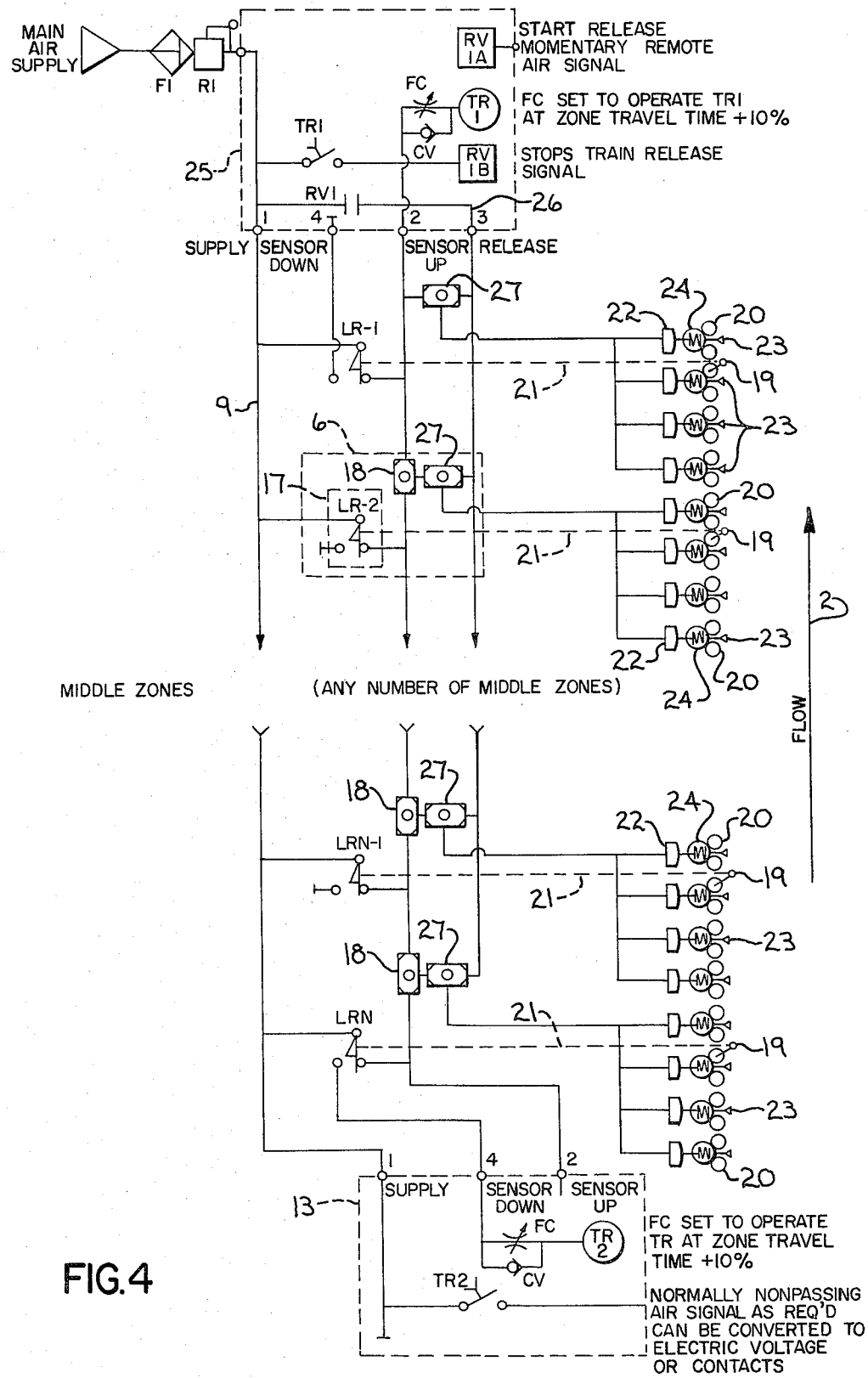
FIG. 4 is a schematic view of an accumulating conveyor similar to FIG. 3 except having a train release feature constituting a fourth embodiment of the present invention.

A modification of the embodiment shown in FIG. 3 is shown in FIG. 4 wherein a train release is provided. In the embodiment shown in FIG. 4, relay valve RV-1 no longer supplies pressure directly to the diaphragm actuators 22 of zone 1, but instead supplies pressure to a train release supply line 26. In addition, the pneumatic logic module 6 for each zone of the conveyor includes a second shuttle valve 27 performing an OR function. Each second OR valve 27 provides pressure from its outlet port to the diaghragm actuators 22 in the same zone of the conveyor in response to fluid pressure at either of its inlet ports. One of the inlet ports of each OR valve 17 comprises the outlet of OR valve 18 in the same zone, and the other inlet port of such OR valve 27 is connected to the train release supply line 26.

In operation, the embodiment shown in FIG. 4 accumulates articles in each zone in the same manner as previously described for the embodiment shown in FIG. 3 with the exception that the outlet from OR valve 18 in each zone passes through OR valve 27 in each zone before being directed toward the diaphragm actuators 22 of the same zone. However, instead of single or sequential release for the articles on the conveyor as described for the embodiment of FIG. 3 the embodiment of FIG. 4 provides train release for all of the articles on the conveyor. Train release is accomplished by actuating release means 25. By switching either a switch button or solenoid valve to a passing condition, pressure is provided to pilot port RV-1A which switches relay valve RV-1 to a not normal or "A" condition wherein pressure is passed to the train release supply line 26 and to one of the inputs for each OR valve 27 with the result that pressure is passed from each OR valve 27 to the diaphragm actuators 22 in the same zone at substantially the same time. Consequently, all of the zones of the conveyor are transformed to "live" zones and begin driving the articles thereon. All of the zones of the conveyor will remain "live" until pressure is provided to the pilot port of timing relay TR-1 whereupon timing relay TR-1 switches to a passing condition to provide pressure to pilot port RV-1B which in turn resets relay valve RV-1 to its normal "B" position or not passing condition. Pressure is thus removed from train release supply line 26. When this occurs the next article driven onto zone 1 of the conveyor will depress sensing roller 19 and switch limit valve LR-1 to its load sensing position which in turn will remove pressure from one of the inlet ports to OR valve 27 in zone 1. Since pressure has already been removed from the other inlet of OR valve 27 in zone 1 by the return of relay valve RV-1 to its normal not passing condition, pressure will no longer be provided to the diaphragm actuators 22 in zone 1. Thus, the drive rollers 24 in zone 1 will become disengaged from load carrying rollers 20 and the brakes 23 will be applied with the result that the article thereon will be stopped on zone 1. This sequence continues for each of the zones of the conveyor to accumulate articles without contact therebetween until each zone has an article thereon.

Figure 5:
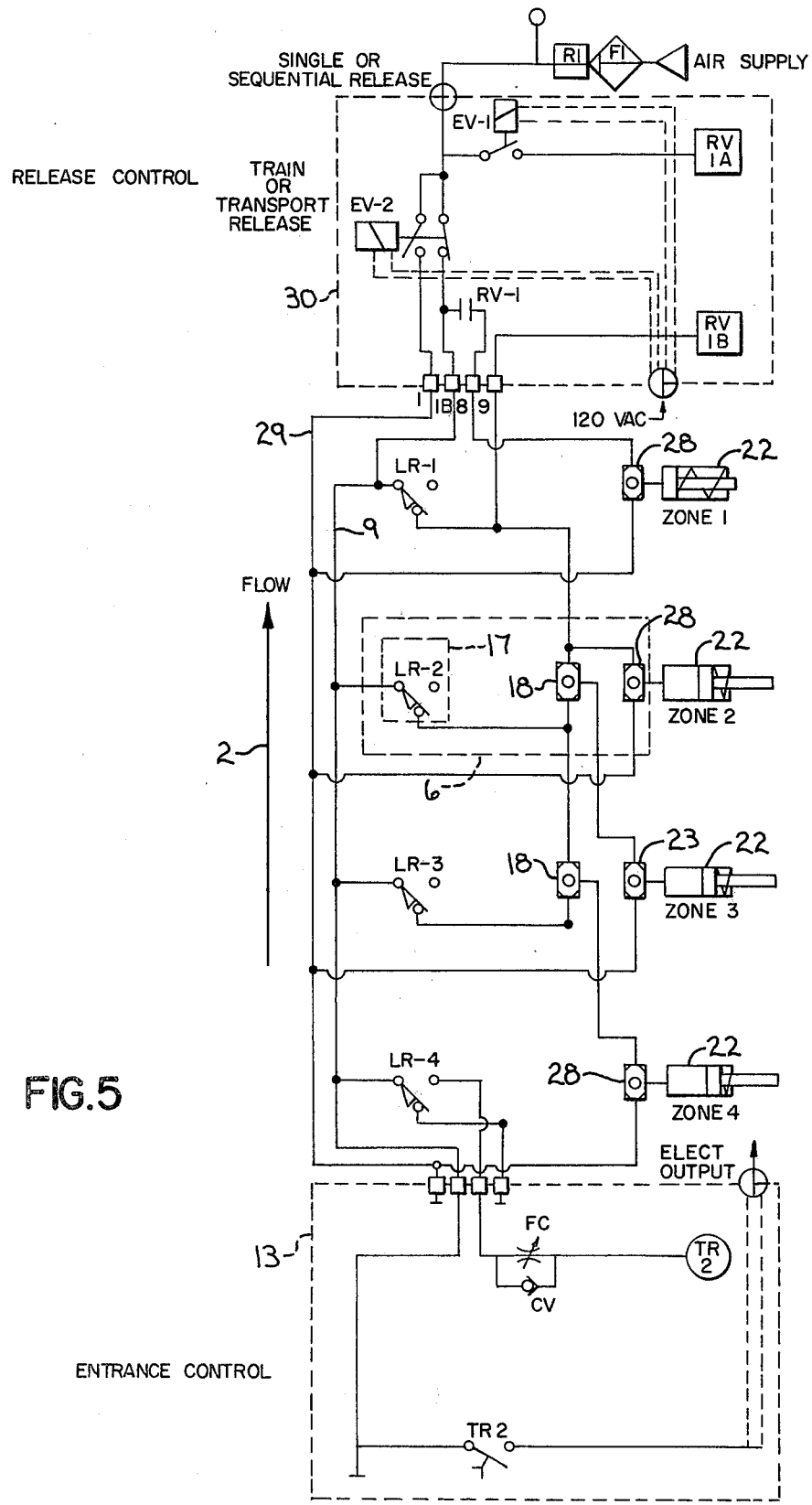
FIG. 5 is a schematic view of an accumulating conveyor having single, sequential and train release features constituting a fifth embodiment of the present invention.

A modification of the embodiment shown in FIGS. 3 and 4 is shown in FIG. 5 wherein single release, sequential release and/or train or transport release is provided. In the embodiment shown in FIG. 5, OR valve 18 provides fluid pressure from its outlet port through the actuators 22 of the adjacent upstream zone of the conveyor in response to fluid pressure at either of its inlet ports. In contrast, OR valves 18 in FIGS. 3 and 4 supply pressure to the actuators 22 of the same zone of the conveyor. In addition, the pneumatic logic module 6 for each zone of the conveyor includes a second shuttle valve 28 performing an OR function. Each second OR valve 28 provides pressure from its outlet port to the actuators 22 in the same zone of the conveyor in response to fluid pressure at either of its inlet ports. One of the inlet ports of each OR valve 28 comprises the outlet of OR valve 18 in the adjacent downstream zone, and the other inlet port of each OR valve 28 is connected to a train release supply line 29. It should be noted that the actuators 22 in FIG. 5 are schematically illustrated as piston/cylinder arrangements having its piston connected to the drive roller of a zone of the conveyor. Each piston/cylinder actuator 22 includes a spring which automatically disengages its drive roller from the load carrying rollers when pressure is not being supplied through OR valve 28.

Release control means indicated generally at 30 and enclosed in broken lines, is employed in conjunction with the 3-way limit valve LR-1 and piston/cylinder actuator 22 at the discharge end of the conveyor, i.e., zone 1 as shown, in order to control the release of conveyed articles. Release means 30 comprises a conventional pilot operated relay valve RV-1 employing an air return and normally in the "B" position as shown in FIG. 5, in which position an article or load on zone 1 is not released. The pilot port RV-1A of relay valve RV-1 is connected to a remote air signal input means, such as a push button or solenoid valve EV-1 shown in FIG. 5, and pilot port RV-1B is connected to the normally passing output of limit valve LR-1 in zone 1, and serves to reset relay valve RV-1 to its normal "B" position. It should also be noted that the output of relay valve RV-1 comprises one of the inputs to OR valve 28 in zone 1.

Release means 30 also incorporates a train release supply line 29 connected to the main air supply line 9. A second remote air signal input means, such as a push button or the solenoid valve EV-2 shown in FIG. 5 is positioned in train release supply line 29 and is normally in a not passing position.

In operation, air supply line 9 provides a source of pneumatic pressure to the input of the OR valves LR-1 through LR-4, each of which is shown in its normal position passing pneumatic pressure to OR valves 18 in the same zone and in the adjacent upstream zone. As shown, each OR valve 18 is passing pneumatic pressure to one of the inputs of OR valve 28 of the adjacent upstream zone. Each OR valve 28 in turn passes pneumatic pressure from its outlet to the actuators 22 to overcome the spring force which normally disengages each drive roller from the load carrying rollers so that the drive rollers are moved into driving engagement with the load carrying rollers. Thus, zones 2-4 are normally "live" in a driving or engaged position. However, since relay valve RV-1 in release control means 30 is normally in a not passing position, and since solenoid valve EV-2 is normally in a not passing position, pressure is not being supplied to either of the inlets of OR valve 28 in zone 1. Therefore, zone 1 is "dead" and in a nondriving or disengaged position.

When the conveyor is accumulating articles, a first article will be conveyed until reaching zone 1 whereupon it will be stopped since zone 1 is "dead". However, upon reaching zone 1 the first article will switch limit valve LR-1 from the position shown in FIG. 5 to an article sensing position where it no longer passes pressure to OR valves 18 and 28 in zone 2. Thus, since OR valve 28 in zone 2 is no longer receiving any input pressure, the cylinder/piston actuator 22 will be disengaged and zone 2 will be transformed from a "live" zone to a "dead" zone. Thus, a second article being conveyed by the conveyor will stop on zone 2. In turn, limit valve LR-2 will be switched to its not passing position whereupon it no longer passes pressure to OR valve 18 in zone 2 or to OR valves 18 and 28 in zone 3. Since OR valve 28 in zone 3 is no longer receiving input pressure, zone 3 becomes "dead". In like manner, each zone of the conveyor will accumulate conveyed articles without contact therebetween until each zone has an article thereon.

As previously described, when an article stops on the entrance zone of the conveyor, relay valve LR-4 will switch to its load sensing position to provide pressure to the pilot port of a timing relay TR-2, and after the desired time interval timing relay TR-2 will switch to a passing position and provide pressure to the control means for a feed conveyor or gate arrangement to prevent additional articles from being fed onto the conveyor.

Single release for an article on zone 1 is accomplished by actuating the release means 30. By switching the solenoid valve EV-1 to a passing condition, pressure is provided to pilot port RV-1A which switches relay valve RV-1 to a not normal or "A" position where pressure is passed to an input or OR valve 28 in zone 1 from air supply line 9. OR valve 28 in zone 1 will then pass pressure to the piston/cylinder actuator 22 in zone 1 resulting in the article thereon being driven off or discharged from zone 1. Once the article is removed from zone 1, limit valve LR-1 will switch to a normal position and pass pressure to the inlet ports or OR valves 18 and 28 in the adjacent upstream zone, or zone 2, of the conveyor. OR valve 28 in zone 2 will pass pressure to the actuators 22 in zone 2 resulting in the driving of an article on zone 2. OR valve 18 in zone 2 will also pass pressure to the actuator 22 in zone 3 to engage its drive roller with its load carrying rollers to drive an article thereon. In like manner, each zone of the conveyor will be transformed from a "dead" zone to a "live" zone.

After relay valve RV-1 is switched to its passing position to supply pressure through OR valve 28 in zone 1 to drive the first article therefrom, and relay valve LR-1 is switched to its normal position, pressure will also be provided to pilot port RV-1B of relay valve RV-1. Thus, relay valve RV-1 will be returned to its normal not passing condition which removes pressure from OR valve 28 in zone 1 and in turn transforms zone 1 to a "dead" zone. Thus, the second article being driven from zone 2 will stop on zone 1 since zone 1 is "dead". As a result, limit valve LR-1 switches to its not passing position which removes pressure from OR valve 28 in zone 2 transforming zone 2 to a "dead" zone. Thus, the third article being driven from zone 3 will stop on zone 2. In like manner, all of the articles on the conveyor will advance one zone. Thus, the control system shown in FIG. 5 provides for a single release function. As is readily understood from the above described operation, sequential release for the embodiment of FIG. 5 may be provided by maintaining pressure to pilot port RV-1A, e.g. by manually holding solenoid valve EV-1 in its passing position until the desired number of articles have been discharged from the conveyor.

The embodiment of FIG. 5 also provides a train release function for all of the articles on the conveyor. Train release is accomplished by actuating release means 30. By switching solenoid valve EV-2 to a passing condition, pressure is removed from air supply line 9 and provided to train release supply line 29 and to one of the inputs of each OR valve 28 with the result that pressure is passed from the OR valve 28 to the actuators 22 at substantially the same time. Consequently all of the zones of the conveyor are transformed to "live" zones and begin driving the articles thereon. All of the zones of the conveyor will remain "live" until pressure is removed from train release supply line 29 by deactuating solenoid valve EV-2. When this occurs the conveyor will return to its original state of operation wherein it is ready to accumulate articles with zone 1 being "dead" and zones 2-4 being "live".

Several preferred embodiments of the present invention have been shown and described herewith. It will be appreciated by those skilled in the art that the invention herein disclosed is subject to other variations and alternate embodiments. For example, articles may be transported in both directions by simply using a reversible motor for rotating the drive rollers. It will also be appreciated that while certain components of the control system of the present invention have been specifically described, equivalent devices may be substituted therefore.

Various modes of carrying out the invention are contemplated as being within the scope of the following claims, particularly pointing out and distinctly claiming the subject matter which is regarded as the invention.

I claim:

1. A control system for an accumulating conveyor having a plurality of load carrying rollers and being divided into a plurality of zones, drive means for driving said rollers, and a fluid actuating means in each of said zones for affecting driving engagement and disengaement of said drive means with and from said rollers in said zone, said control system comprising a pneumatic logic module in each of said zones including:
   a limit valve having a fluid passing position and a fluid not-passing position, said limit valve being movable to its not-passing position in response to the presence of a conveyed article in the same zone; and
   an OR valve having an outlet port and a pair of inlet ports, said OR valve providing fluid pressure from said outlet port to the actuating means of one of the zones of said conveyor in response to fluid pressure at either of said inlet ports, one of said inlet ports being connected to said limit valve in the same zone and the other of said inlet ports being connected to the logic module of the adjacent downstream zone of said conveyor.

2. The control system of claim 1, having a discharge zone at the extreme downstream end of said conveyor, and further including a release control means connected to the fluid actuating means in said discharge zone for causing engagement of said drive means in response to a manual input to release a conveyed article thereon.

3. The control system of claim 1, wherein said OR valve provides fluid pressure from its outlet port to the actuating means in the adjacent upstream zone of said conveyor, and the other of said inlet ports of said OR valve is connected to the outlet port of the OR valve in the logic module of the adjacent downstream zone of said conveyor.

4. The control system of claim 1, wherein said OR valve provides fluid pressure from its outlet port to the actuating means in the same zone of said conveyor, and the other of said inlet ports of said OR valve is connected to the limit valve in the logic module of the adjacent downstream zone of said conveyor.

5. The control system of claim 1, wherein said OR valve provides fluid pressure from its outlet port to the actuating means in the adjacent upstream zone of said conveyor, and the other of said inlet ports of said OR valve is connected to the limit valve in the logic module of the adjacent downstream zone of said conveyor.

6. A control system for an accumulating conveyor having a plurality of load carrying rollers and being divided into a plurality of zones, drive means driving said rollers, and a fluid actuating means in each of said zones for affecting driving engagement and disengagement of said drive means with and from said rollers in said zone, said control system comprising a pneumatic logic module in each of said zones including:
   a limit valve having a fluid passing position and a fluid not-passing position, said limit valve being movable to its not-passing position in response to the presence of a conveyed article in the same zone; and
   an OR valve having an outlet port and a pair of inlet ports, said OR valve providing fluid pressure from said outlet port to the actuating means in the adjacent upstream zone of said conveyor in response to fluid pressure at either of said inlet ports, one of said inlet ports being connected to said limit valve in the same zone and the other of said inlet ports being connected to the outlet port of the OR valve in the logic module of the adjacent downstream zone of said conveyor.

7. The control system of claim 6, having a discharge zone at the extreme downstream end of said conveyor, and further including a release control means connected to the fluid actuating means in said discharge zone for causing engagement and disengagement of said drive means in response to an input.

8. The control system of claim 7, wherein said release control means includes a normally not passing pilot operated relay valve having a first input connected to a manual input means operable to switch said relay valve to its passing position, a second input connected to a source of fluid pressure operable to switch said relay valve to its not passing position, and an output connected to the actuating means of the discharge zone of said conveyor.

9. The control system of claim 8, wherein said release control means further includes a timing relay positioned between the normally passing output of said discharge zone limit valve and the second input of said relay valve for controlling the time interval said relay valve is in its passing position.

10. The control system of claim 9, further including a train release means comprising a second OR valve in each of said zones, each of said second OR valves providing fluid pressure from its outlet port to the actuating means in the adjacent upstream zone of said conveyor, and having one of its inlets comprising the output of said first OR valve in the same zone, and the other of its inlets connected to the output of said relay valve.

11. A control system for an accumulating conveyor having a plurality of load carrying rollers and being divided into a plurality of zones, drive means for driving said rollers, and a fluid actuating means in each of said zones for affecting driving engagement and disengagement of said drive means with and from said rollers in said zone, said control system comprising a pneumatic logic module in each of said zones including:
   a limit valve having a fluid passing position and a fluid not-passing position, said limit valve being movable to its not-passing position in response to the presence of a conveyed article in the same zone; and an OR valve having an outlet port and a pair of inlet ports, said OR valve providing fluid pressure from said outlet port to the actuating means of the same zone of said conveyor in response to fluid pressure at either of said inlet ports, one of said inlet ports being connected to said limit valve in the same zone and the other of said inlet ports being connected to the limit valve in the logic module of the adjacent downstream zone of said conveyor.

12. The control system of claim 11, having a discharge zone at the extreme downstream end of said conveyor, and further including a release control means connected to the fluid actuating means in said discharge zone for causing engagement and disengagement of said drive means in response to an input.

13. The control system of claim 12, wherein said release control means includes a normally not passing pilot operated relay valve having a first input connected to a manual input means operable to switch said relay valve to its passing position, a second input connected to a source of fluid pressure operable to switch said relay valve to its not passing position, and an output connected to the actuating means of the discharge zone of said conveyor.

14. The control system of claim 13, wherein said release control means further includes a timing relay positioned between the normally passing output of said discharge zone limit valve and the second input of said relay valve for controlling the time interval said relay valve is in its passing position.

15. The control system of claim 14, further including a train release means comprising a second OR valve in each of said zones, each of said second OR valves providing fluid pressure from its outlet port to the actuating means in the same zone of said conveyor, and having one of its inlets comprising the output of said first OR valve in the same zone, and the other of its inlets connected to the output of said relay valve.

16. A control system for an accumulating conveyor having a plurality of load carrying rollers and being divided into a plurality of zones, drive means for driving said rollers, and a fluid actuating means in each of said zones for affecting driving engagement and disengagement of said drive means with and from said rollers in said zone, said control system comprising a pneumatic logic module in each of said zone including:

a limit valve having a fluid passing position and a fluid not-passing position, said limit valve being movable to its not-passing position in response to the presence of a conveyed article in the same zone; and an OR valve having an outlet port and a pair of inlet ports, said OR valve providing fluid pressure from said outlet port to the actuating means in the adjacent upstream zone of said conveyor in response to fluid pressure at either of said inlet ports, one of said inlet ports being connected to said limit valve in the same zone, and the other of said inlet ports being connected to the limit valve in the logic module of the adjacent downstream zone of said conveyor.

17. The control system of claim 16, having a discharge zone at the extreme downstream end of said conveyor, and further including a release control means connected to the fluid actuating means in said discharge zone for causing engagement and disengagement of said drive means in response to an input.

18. The control system of claim 17, wherein said release control means includes a normally not passing pilot operated relay valve having a first input connected to a manual input means operable to switch said relay valve to its passing position, a second input connected to a source of fluid pressure operable to switch said relay valve to its not passing position, and an output connected to the actuating means of the discharge zone of said conveyor.

19. The control system of claim 18, further including a train release means comprising a train release air supply line, and a second OR valve in each of said zones, each of said second OR valves providing fluid pressure from its outlet port to the actuating means in the same zone of said conveyor, and having one of its inlets comprising the output of said first OR valve in the adjacent downstream zone, and the other of its inlets connected to the train release air supply line.

* * * * *